United States Patent [19]

Leroux

[11] Patent Number: 4,566,159
[45] Date of Patent: Jan. 28, 1986

[54] SAFETY CLASP FOR A NECKLACE OR BRACELET CHAIN

[76] Inventor: Jacques Leroux, 3 et 5 rue de la République, 60100 Creil, France

[21] Appl. No.: 515,120

[22] Filed: Jul. 19, 1983

[30] Foreign Application Priority Data

Aug. 3, 1982 [FR] France .................. 82 13512

[51] Int. Cl.[4] ............................................. A44B 13/00
[52] U.S. Cl. ........................................ 24/599; 24/238; 24/242; 24/585; 24/618
[58] Field of Search .................. 24/585, 664, 230.5 R, 24/599, 374, 238, 242, 616, 118, 627, 637, 116 A, 536, 20 R

[56] References Cited

U.S. PATENT DOCUMENTS

| 889,230 | 6/1908 | Hoffman | 24/616 |
|---|---|---|---|
| 1,240,381 | 9/1917 | Smith | 24/242 |
| 1,464,134 | 8/1923 | Hoy | 24/242 |
| 1,663,621 | 3/1928 | Bowman | 24/585 |
| 1,957,141 | 5/1934 | Jordan | 24/618 |
| 2,626,456 | 1/1953 | Harrison | 24/20 R |
| 2,986,788 | 6/1961 | Hasek | 24/238 |
| 3,212,153 | 10/1965 | Lynch | 24/238 |
| 3,214,810 | 11/1965 | Mathison | 24/536 |
| 3,427,691 | 2/1969 | Johnston | 24/374 |
| 4,097,970 | 7/1978 | Cagnato | 24/238 |

FOREIGN PATENT DOCUMENTS

| 51110 | 4/1935 | Denmark | 24/599 |
|---|---|---|---|
| 2489671 | 3/1982 | Fed. Rep. of Germany | 24/599 |
| 677224 | 8/1952 | United Kingdom | 24/238 |

Primary Examiner—Victor N. Sakran
Attorney, Agent, or Firm—McAulay, Fields, Fisher, Goldstein & Nissen

[57] ABSTRACT

A safety clasp which may be used in particular for a necklace or bracelet chain, comprises two pieces sliding one in the other, namely an outer sleeve and a slide element housed inside the sleeve. The sleeve has hooked thereto, at one end, the first end link of a chain. The sleeve also has a slot which defines a transverse arm opening and a connected longitudinal arm opening which extends in the direction of the end of the sleeve opposite to where the first end link is hooked. The sleeve is adapted to move longitudinally with respect to the sleeve and presenting, in its rear part, a notch for receiving the second end link of the chain. The inner slide element presents, in its front part opposite that part where a notch is provided, an elastically deformable arm terminating in a tooth engaging in a hole for locking provided in the wall of the sleeve. Consequently, in position of closure, in which the tooth of the arm is engaged in the hole for locking, the second end link is retained by the rear edge of the notch in the sliding element, being maintained spaced apart from the end of the longitudinal arm of the slot in the sleeve.

18 Claims, 6 Drawing Figures

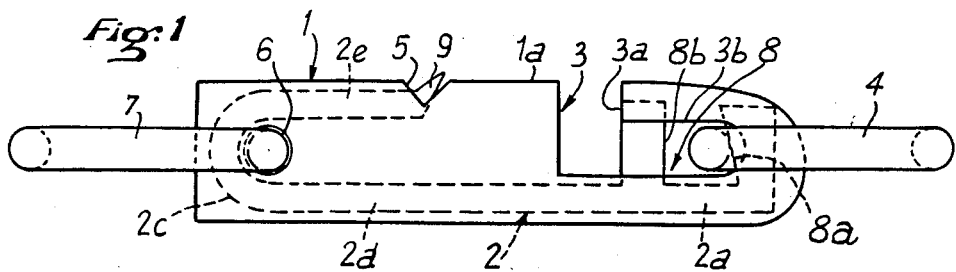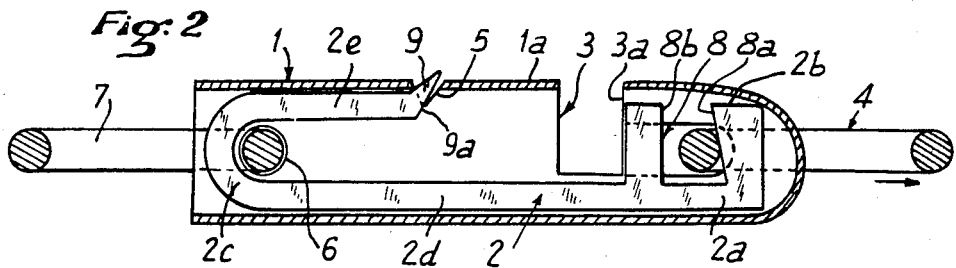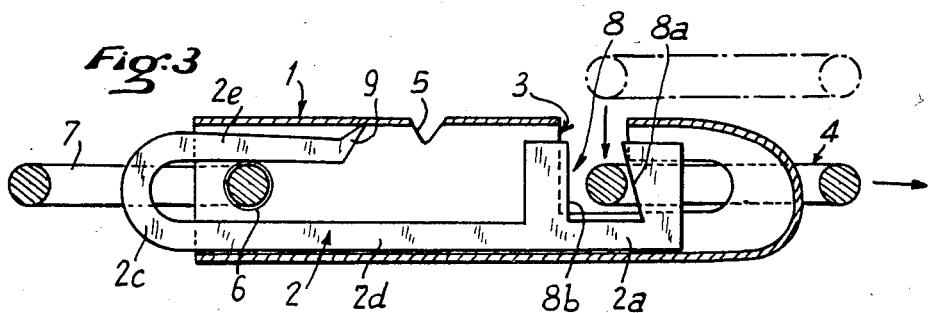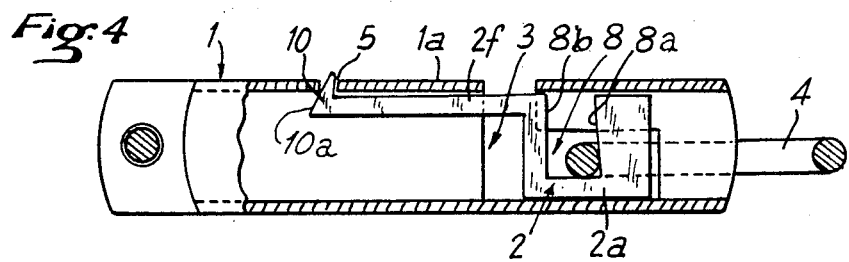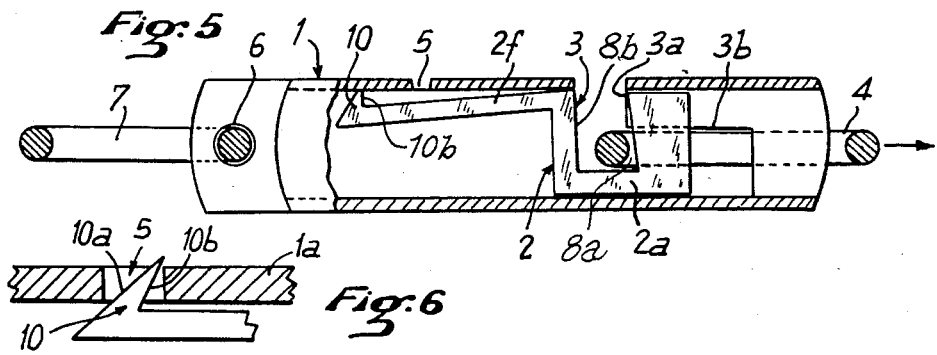

SAFETY CLASP FOR A NECKLACE OR BRACELET CHAIN

BACKGROUND OF THE INVENTION

The present invention relates to a safety clasp which may be used more particularly but non-exclusively for articles of jewellery, such as necklace chains, bracelets, etc . . . .

Among the various types of clasps for necklace chains existing at present, certain types comprise two pieces sliding in each other, namely an outer sleeve at one end of which is hooked an end link of a necklace chain, and an inner slide element of which the relative movement with respect to the outer sleeve makes it possible to engage the other end link of the chain in this slide element. Certain clasps of this type, such as those described in U.S. Pat. No. 3,984,900, comprise, in that part of the outer sleeve which is opposite the part where the first link of the chain is hooked, a slot for introduction of the second end link of the chain, this slot being substantially in the form of an L of which one arm, extending transversely, opens out through an access opening in the wall of the sleeve and of which the other arm extends longitudinally. The slide element presents a notch opening out transversely and adapted to be brought opposite the transverse arm of the slot, to enable the second link of the chain to be engaged in this slot and this notch and then make it possible to pull, via this link, on the slide element to bring the second link in the bottom of the longitudinal arm of the slot.

Although such a clasp makes it possible easily to engage and disengage the second link of the chain, i.e. the one which is not permanently connected to the outer sleeve, it nonetheless presents the drawback of opening unexpectedly since the inner slide element can move freely inside the outer sleeve.

Another type of known clasp is described, for example, in French Pat. No. 2 270 820. This clasp comprises a slide element which may be locked in the outer sleeve, in position of closure, by means of a tooth engaging in a hole provided in the wall of the sleeve. However, when the clasp is closed, the slide element projects outside the outer sleeve, in the longitudinal direction, and at that spot it presents an opening in which is engaged the second link of the chain. Such a clasp presents the drawback of opening easily if the chain is pulled upon, the end part of the slide element projecting outside the sleeve being easily deformed. Furthermore, it is not easy to open the clasp since, in order to be able to bring the slide element completely out of the sleeve, it is necessary to push the tooth previously, using one's nail, for example, for it to leave the hole in the sleeve.

SUMMARY OF THE INVENTION

It is an object of the present invention to overcome these drawbacks by providing a clasp of particularly simple design, for which the opening and closure manoeuvres may easily be effected and which, in position of closure, ensures an efficient locking against any untimely opening.

To this end, this safety clasp, which may be used in particular for a necklace or bracelet chain, comprising two pieces sliding one in the other, namely an outer sleeve to which a first end link of the chain is hooked, in its front part, and which is provided in its rear part with a slot for the introduction of a second end link of the chain. The slot is shaped in the form of an L with a transverse arm opening in the wall of the sleeve and a longitudinal arm extending in the direction of the end of the sleeve opposite that were the first link is hooked. A slide element is housed inside the sleeve and adapted to move longitudinally with respect thereto. The slide is formed having in its rear part, a notch for receiving the second end link of the chain, this notch opening laterally in the slide element and adapted to be brought opposite the transverse arm of the slot in the sleeve to allow the introduction of the second link. The inner slide element presents, in its front part opposite that part where the notch is provided, an elastically deformable arm terminating in a tooth engaging in a hole for locking provided in the wall of the sleeve. The arrangement is such that, in position of closure, in which the tooth of the arm is engaged in the hole for locking, the second link is retained by the rear edge of the notch in the sliding element, being maintained spaced apart from the end of the longitudinal arm of the slot.

The clasp according to the invention offers the advantage that, in position of closure, the slide element is firmly maintained inside the sleeve, further to the engagement of its tooth in the hole for locking, and that the pulling effort exerted by the second link is applied solely to the inner slide element since this second link is not in contact with the end of the longitudinal arm of the slot in the sleeve.

Consequently, the rear end part of the sleeve which is subjected to no effort stress, does not risk being deformed or pulled open under the action of the traction exerted on the second link. Furthermore, another advantage offered by the clasp according to the invention is that it is very easy to open since it suffices to exert, via the second link, a force on the front edge of the notch in the slide element, in the direction opposite the normal direction of traction, this force having for its effect to automatically disengage the tooth of the slide element out of the hole and thus to allow the displacement of the slide element inside the sleeve until the notch in the slide element comes opposite the transverse arm of the slot in the sleeve, thus enabling the second link to be disengaged.

BRIEF DESCRIPTION OF THE DRAWINGS

The invention will be more readily understood on reading the following description with reference to the accompanying drawings, in which:

FIG. 1 is a view in elevation of a first embodiment of the clasp according to the invention, in closed position.

FIG. 2 is a view in longitudinal section of the clasp of FIG. 1. in closed position.

FIG. 3 is a view in longitudinal section of the clasp of FIG. 1, in open position for the introduction of the second link.

FIG. 4 is a view in longitudinal section of a variant embodiment of the clasp, in closed position.

FIG. 5 is a view in longitudinal section of the clasp of FIG. 4, in open position.

FIG. 6 is a view in longitudinal section of a variant embodiment of the locking tooth.

DESCRIPTION OF THE PREFERRED EMBODIMENTS

Referring now to the drawings, the clasp shown in FIGS. 1 to 3 comprises two parts sliding in one another, namely an outer sleeve 1, of circular, rectangular or other cross section, and in inner slide element 2.

The outer sleeve 1 is provided, in its rear end part, with a slot 3 for the introduction of an end link 4 of a necklace chain. This slot 3 presents the form of an L and it is constituted by a transverse arm 3a opening in the upper edge 1a of the sleeve 1, and by a longitudinal arm 3b extending rearwardly and stopping at a certain distance from the rear end of the sleeve 1. It goes without saying that the slot 3 is provided on each side of the longitudinal plane of symmetry of the sleeve.

The sleeve 1 also presents a hole 5 in its upper edge 1a, towards its front part. Finally, the sleeve 1 comprises, in its front end part, a hole 6 through which passes the other end link 7 of the necklace chain.

The inner slide element 2 comprises, in its rear end part 2a, a notch 8 extending substantially transversely, substantially in the form of a U and opening in the upper edge 2b of the rear end part 2a. This notch 8 is adapted to receive the end link 4. Furthermore, the slide element 2 presents, in its front part 2c, the form of a U extending longitudinally in the direction of the rear part 2a. This front part 2c comprises a longitudinal lower arm 2d of the U which extends forwardly of the rear part 2a with which it is integrally connected. The other upper arm 2e of the U is shorter than the lower arm 2d and terminates in a locking tooth 9 projecting upwardly and which is adapted to engage in the hole 5 of the sleeve 1. This tooth is defined by a rear and lower face 9a which is inclined inwardly in the direction of the front part 2c of the slide element 2, which ensures better locking.

From the foregoing description, it is seen that the clasp acording to the invention is closed very easily. In fact, to ensure introduction of the end link 4, it suffices to displace the slide element 2 so as to bring the transverse arm 3a of the slot 3 in the sleeve 1 and the notch 8 of the slide element 2, opposite one another that is, in alignment and the link 4 may then be engaged transversely in the notch 8, as indicated by the arrow in FIG. 3. By pulling on the slide element towards the right in FIG. 3, via the link 4, the position of closure illustrated in FIG. 2 is then obtained.

In this position of closure, the link 4, subjected to a traction towards the right, is solely in abutment against the rear edge 8a of the notch 8, and it does not come into contact with the rear end of the longitudinal arm 3b of the slot 3. In other words, in the rear part of the clasp, the sleeve 1 is subjected to no effort stress and can therefore not be deformed, as the effort of traction exerted by the link 4 is absorbed solely by the slide element 2. The clasp is maintained locked in position of closure further due to the engagement of the tooth 9 in the hole 5, as is apparent in FIG. 2. The lengths of the lower and upper arms 2d and 2e, respectively, of the front part 2c of the slide element 2 are determined so that, in position of closure, in which the tooth 9 is engaged in the hole 5, the rear edge 8a of the notch 8 is located slightly in front of the end of the longitudinal arm 3b of the notch 3, in order thus to maintain the link 4 spaced apart from this end. Consequently, the effort of traction exerted by the link 4 solely on the rear part 2a of the slide element 2 is transferred by the upper arm 2e of the tooth 9, to the upper and front part of the sleeve 1 which is very robust as it is not notched.

In addition to its remarkable characteristic of robustness, the clasp according to the invention offers the advantage that it is very easy to open. In fact, it suffices to pull the slide element 2 towards the left, from the position of closure illustrated in FIG. 2, by means of the link 4 coming into contact by thrust or traction with the front edge 8b of the notch 8. Such a traction or thrust towards the left in FIG. 2 brings the slide element into the position of opening shown in FIG. 3 The slide element 2 is unlocked automatically as the tooth 9 escapes the hole 5 when the slide element 2 is pushed towards the left, the upper arm 2e being slightly pushed downwardly by the upper edge 1a of the sleeve 1.

To increase the resistance of the notch 8 of the slide element 2, the rear edge 8a of the notch 8, on which the link 4 abuts, is advantageously inclined inwardly in the direction of the rear end of the clasp, so that the notch 8 is not in the form of a U with parallel arms, but rathermore in the form of a right-angled trapezium.

FIGS. 4 and 5 illustrate a variant embodiment of the clasp in which the front part of the slide element 2 is constituted solely by a longitudinal upper arm 2f, extending towards the front end of the clasp and terminating in a locking tooth 10 engaging in the hole 5 of the sleeve 1. In this case, the locking tooth 10 is triangular in form and is defined by a front, upper side 10a and a rear lower side 10b. The front side 10a is inclined inwardly in the direction of the front end of the clasp, whilst the rear side 10b may extend transversely or perpendicularly to the axis, in which case the tooth 10 is effectively in the form of a right-angled triangle. Alternatively, tooth 10 may also be inclined inwardly in the direction of the front end, as illustrated in FIG. 6, the slope of the rear side 10b with respect to the axis then being greater than that of the front side 10a. This latter arrangement strengthens the hooking of the tooth 10 in the hole 5.

Although the clasp according to the invention has been described as being more particularly used for an article of jewellery, in the foregoing description, it goes without saying that it may also be employed in any other technical domain.

What is claimed is:

1. A safety clasp for a necklace or bracelet chain, said clasp comprising two pieces sliding one in the other, one of said pieces comprising an outer sleeve to which a first end link of the chain is hooked, in its front part, and which is provided in its rear part with a slot for the introduction of a second end link of the chain, said slot being L-shaped with a transverse slot arm opening in the wall of the sleeve and a longitudinal arm extending in the direction of the rear part of the sleeve opposite to that where the first end link is hooked, the longitudinal arm portion of said slot terminating spaced apart from the rear end of said sleeve, said sleeve having a hole in its outer surface located between its front part and said slot, the other one of said pieces comprising a slide element housed inside said sleeve and adapted to move longitudinally with respect thereto, said slide element, in its rear part, having a notch for receiving the second end link of the chain, said notch opening laterally in the slide element and adapted to be brought opposite the transverse arm opening of the slot in the sleeve and in alignment therewith upon longitudinal movement of said slide element to allow the introduction of the second end link, said inner slide element presenting, in its front part opposite to that part where the notch is provided, an elastically deformable arm terminating in a tooth adapted to engage the hole in said sleeve for locking said pieces together, whereby when said slide element is moved longitudinally to a position of closure, said tooth is engaged in said hole for locking and said notch is positioned out of alignment with the transverse arm of the slot and in registry with the longitudinal arm of the slot in said sleeve, the second end link being retained by the rear edge of the notch in said sliding element within the longitudinal arm of the slot in said sleeve, and maintained spaced apart from the end of said longitudinal arm when said sliding element is in its position of closure.

2. The safety clasp according to claim 1, wherein the front part of said slide element is in the form of a U extending longitudinally in the direction of the rear part, said U-shaped front part comprising a longitudinal lower arm which extends forwardly of the rear part with which it is integrally connected and an upper arm shorter than the lower arm and terminating in the locking tooth.

3. The safety clasp according to claim 1, wherein the locking tooth is defined by a lower rear face which is inclined inwardly in the direction of the front part of the slide element.

4. The safety clasp according to claim 1, wherein the front part of the slide element is constituted solely by a longitudinal upper arm extending towards the front end of the clasp and terminating in the locking tooth.

5. The safety clasp according to claim 1, wherein the locking tooth is triangular in form and is defined by an upper front side and a lower rear side, the front side being inclined inwardly in the direction of the front end of the clasp.

6. The safety clasp according to claim 5, wherein the rear side of the tooth is perpendicular to the axis of the arm of said slide, and the tooth has the form of a right-angled triangle.

7. The safety clasp according to claim 5, wherein the lower rear side of the tooth is inclined inwardly, in the direction of the front end of the clasp, the slope of said rear side with respect to the axis of the arm of said slide being greater than that of the front side of said tooth.

8. The safety clasp according to claim 1, wherein the rear edge of the notch in the slide element on which the second end link abuts, is inclined inwardly in the direction of the rear end of the clasp, said notch being in the form of a right-angled trapezium.

9. The safety clasp according to claim 1, wherein said locking tooth has an upper front side and a lower rear side, said front and rear sides being inclined inwardly in the direction of the front end of said clasp.

10. A safety clasp for a necklace or bracelet chain comprising:
an outer sleeve and an inner slide element, said slide disposed for longitudinal movement in said sleeve between a latched position and an unlatched position,
said sleeve having a front part to which a first end link of the chain is connected and a rear part formed with a slot adapted to receive a second end link of the chain, said slot being L-shaped and defining an opening having a first portion extending transversely to the axis of said sleeve and a second portion extending longitudinally in the direction of the rear end of said sleeve and terminating spaced apart from said rear end, said sleeve further having a hole located between its front part and said slot,
said slide element having a front part comprising a resiliently displaceable arm terminating in a tooth adapted to engage the hole in said sleeve when said slide is moved to its latched position for locking said slide within said sleeve,
said slide element further having a rear part formed with a notch extending laterally thereof and defining an opening extending transversely to the axis of said sleeve when said slide is positioned therein, said notch being disposed to be brought opposite to and in alignment with the transversely extending portion of the slot in said sleeve when said slide is moved to its unlatched position to receive the second end link of the chain and out of such alignment and in registry with the longitudinally extending portion of said slot to capture the second end link therein when said slide is moved to its latched position in the direction of the rear end of said sleeve,
the second end link being retained by the notch in said slide and maintained spaced apart from the end of the longitudinally extending portion of the slot in said sleeve when said slide is in its latched position to prevent deformation of the rear end of the clasp when the chain is under tension.

11. The safety clasp as defined in claim 10, wherein the front part of said slide element is U-shaped having upper and lower arms extending longitudinally in the direction of the rear part, said lower arm being integrally connected to said rear part and said upper arm being shorter than said lower arm and terminating in said locking tooth.

12. The safety clasp as defined in claim 10, wherein said locking tooth is defined by a lower rear face which is inclined in the direction of the front part of said slide element.

13. The safety clasp as defined in claim 10, wherein the displaceable arm of said slide element extends longitudinally toward the front end of said clasp.

14. The safety clasp as defined in claim 10, wherein said locking tooth is triangular in shape and defined by an upper front side and a lower rear side, said front side being inclined inwardly in the direction of the front end of said clasp.

15. The safety clasp as defined in claim 14, wherein the rear side of said locking tooth is perpendicular to the axis of the arm of said slide, said tooth being in the shape of a right-angled triangle.

16. The saftey clasp as defined in claim 14, wherein the lower rear side of said locking tooth is inclined inwardly in the direction of the front end of said clasp, the slope of said rear side with respect to the axis of the arm of said slide being greater than that of the front side of said tooth.

17. The safety clasp as defined in claim 10, wherein the rear edge of the notch in said slide element is inclined inwardly in the direction of the rear end of said clasp, said notch being in the form of a right-angled trapezium.

18. The safety clasp as defined in claim 10, wherein said locking tooth has an upper front side and a lower rear side, said front and rear sides being inclined inwardly in the direction of the front end of said clasp.

* * * * *